United States Patent [19]

Bourg

[11] Patent Number: 5,095,851
[45] Date of Patent: Mar. 17, 1992

[54] METHOD AND APPARATUS FOR MARICULTURE UTILIZING CONVERTED HOPPER BARGES OR THE LIKE

[76] Inventor: Carl J. Bourg, 4440 Shrimpers Row, Houma, La. 70363

[21] Appl. No.: 526,452

[22] Filed: May 21, 1990

[51] Int. Cl.⁵ ............................................. A01K 61/00
[52] U.S. Cl. .......................................... 119/3; 119/4; 114/36
[58] Field of Search ............... 119/3, 4, 2; 114/26, 114/36, 37

[56] References Cited

U.S. PATENT DOCUMENTS

| | | | |
|---|---|---|---|
| 212,389 | 2/1879 | Lang | 119/4 |
| 227,855 | 5/1880 | Stewart | 119/4 |
| 237,351 | 2/1881 | Weems | 119/4 |
| 249,942 | 11/1881 | Hughes | 119/4 |
| 4,211,183 | 7/1980 | Hoult | 119/3 |
| 4,798,168 | 1/1989 | Vadseth et al. | 119/3 |
| 4,909,186 | 3/1990 | Nakamune et al. | 119/3 |

FOREIGN PATENT DOCUMENTS

| | | | |
|---|---|---|---|
| 839455 | 6/1981 | U.S.S.R. | 119/3 |
| 2201 | of 1880 | United Kingdom | 119/4 |
| 1436125 | 5/1976 | United Kingdom | 119/3 |

Primary Examiner—John G. Weiss
Attorney, Agent, or Firm—C. Emmett Pugh

[57] ABSTRACT

A new and unique method and apparatus for the farming of redfish and the like. The exemplary embodiment of the present invention teaches an apparatus comprising a converted hopper barge retrofitted to allow circulation of water surrounding the vessel within the habitation tank(s). The present invention further teaches a fully self-contained farming apparatus providing the optimum environment for mariculture including circulation, oxygenation, replenishing of the water as well as an apparatus designed to systematically feed the crop and dispensing antibiotics and other solutions into the water environment as needed. The apparatus is designed for floating transport to a shallow water area with optimal salinity, PH, and purity and then be partially submerged via the opening of large coffer passages. The passages include a barrier for preventing the escape of the crop, while allowing new water circulation of the habitat. The present system is designed to farm fingerling size fish to a marketable size as efficiently and quickly as possible; when the fish have been farmed to the desired size, the coffer doors are closed, water is removed from the farming tanks to allow the vessel to float, and the barge is transported an area where the fish may be harvested. the present apparatus may be used in the mariculture of a variety of marine species, and may also be used for the purification of shellfish such as oysters or the like in an alternative embodiment, which teaches the multiple stacking of oyster racks in the tank area.

15 Claims, 10 Drawing Sheets

METHOD AND APPARATUS FOR MARICULTURE UTILIZING CONVERTED HOPPER BARGES OR THE LIKE

BACKGROUND OF THE INVENTION

1. Field of Invention

The present invention relates to mariculture systems and more particularly to a new and unique method and apparatus for the farming of redfish and the like. The exemplary embodiment of the present invention teaches an apparatus comprising a converted hopper barge retrofitted to allow circulation of water surrounding the vessel within the habitation tank(s).

Further, the present invention teaches a fully self-contained farming apparatus having means to provide the optimum environment for mariculture including means to provide circulation, oxygenation, and exchange of the water as well as means to systematically feed the crop and means of dispensing antibiotic and other medication into the water environment as needed.

The apparatus is designed for floating transport to a shallow water area of ten foot depth or less with optimal salinity, PH, and purity and then be partially submerged via the opening of large coffer passages. The passages include barrier means of preventing the escape of the crop, while allowing new water circulation of the habitat.

The present system is designed to farm fingerling size fish to a marketable size as efficiently and quickly as possible; when the fish have been farmed to the desired size, the coffer passages are closed, water is removed from the ballast tank area of the barges to allow the vessel to float, and the barge is transported an area where the fish may be harvested.

The present apparatus may be used in the mariculture of a variety of marine species, and may also be used for the purification of mollusks such as oysters or the like in an alternative embodiment of the present invention, which teaches the multiple stacking of oyster racks in the tank area.

2. Prior Art & General Background

As may be determined from a review of the below cited patents and discussion, the prior art does not contemplate a readily transportable mariculture system as contemplated in the present invention.

A list of prior patents which may be of interest is presented below:

| Patent No. | Patentee(s) | Issue Date |
| --- | --- | --- |
| RE 30,038 | Sweeney | Jun 26, 1979 |
| 2,283,472 | B. M. Tuxhorn | May 19, 1942 |
| 3,523,520 | Earl E. Evans | Aug 11, 1970 |
| 4,003,338 | Neff et al | Jan 18, 1977 |
| 4,116,164 | Shabi et al | Sep 26, 1978 |
| 4,182,268 | Berger | Jan 8, 1980 |
| 4,239,782 | Cinquemani | Dec 16, 1980 |
| 4,393,846 | Mowbray et al | Jul 19, 1983 |
| 4,422,408 | Pohlhausen | Dec 27, 1983 |
| 4,481,904 | Fletcher | Nov 13, 1984 |
| 4,492,182 | Wensman et al | Jan 8, 1985 |
| 4,509,285 | Smith | Apr 9, 1985 |
| 4,594,965 | Asher, Jr. et al | Jun 17, 1986 |
| 4,597,360 | Johnson | Jul 1, 1986 |
| 4,610,219 | Morimura | Sep 9, 1986 |
| 4,658,757 | Cook | Apr 21, 1987 |
| 4,738,220 | Ewald, Jr. | Apr 19, 1988 |
| 4,747,369 | Gotmalm | May 31, 1988 |

U.S. Pat. No. 4,003,338 issued 1977 teaches an "Aquatic Animal Cage and Fabrication Method" wherein a submersible cage is used to maintain fish comprising a heavy duty, corrosion resistant closed netting affixed to a buoyant body for maintaining the upper portion of the cage on the surface.

U.S. Pat. No. 4,747,369 issued 1988 teaches again a fish breeding device utilizing the "floating cage" concept. The '369 apparatus is designed for utilization in the open ocean, where rough seas were "inappropriate" for prior art devices.

U.S. Pat. No. 4,738,220 issued 1988 teaches a fish farm and hatchery comprising transportable tank trailers and contemplates use with fresh or salt water fish. The invention teaches an automated system for automatically gathering eggs, segregating them in a separate hatchery tank where they are less likely to be consumed.

U.S. Pat. No. 4,610,219 teaches another floating cage design for fish breeding in saltwater environments. The '219 apparatus is configured for large scale fish breeding, providing materials which are resistant to the surface interference of the ocean.

The above prior art systems are wholly distinguishable from the present invention in apparatus as well as method, and in fact would not be suitable for use in conjunction with the mariculture system contemplated in the present invention.

3. General, Summary Discussion of the Invention

The present invention provides a mariculture system specifically designed to be highly reliable, relatively economical and very cost effective.

While the prior art is limited to various "floating cage" designs, the present invention provides a fully controllable environment for optimal healthy growth, significantly reducing period of time needed to grow the fish, as well as providing greater yield of fish per square footage of tank area.

This optimal growth is due to extensive circulation and maintaining optimal water characteristics, including oxygen content, PH level, and food, while continually monitoring and controlling sludge or pollutant content, as well as viral, bacterial, and fungicidal parasites.

The present system is designed to be transported with the mariculture crop intact should the water quality in the area become unsatisfactory, or due to foul weather or other factors.

The present system has its own electrical power generation means, and teaches a new and unique, low maintenance hydraulic system for circulating and exchanging large amounts of water for many months at a time, non-stop if necessary.

The present invention as taught and tested in the preferred embodiment comprises a converted hopper barge having means to raise and lower itself in the water via the opening and closing of large coffer passages on the sides of the vessel. In order to prevent marine life from escaping or entering the vessel, large grids or screens are slidingly engaged over the passages.

The preferred, exemplary embodiment of the present invention teaches a hopper barge having three separate segregation areas in order to "space" the crop or segregate according to size.

It is noted that the present invention is not limited to the farming of redfish and may be used with any number of species of salt or freshwater fish, as well as crustaceans, mollusks and the like.

It is thus an object of the present invention to provide a self-contained mariculture system which increases the growth rate and quality of redfish or the like in an efficient and highly cost effective manner.

It is another object of the present invention to provide a method and apparatus for utilizing converted hopper barges for mariculture.

It is still another object of the present invention to provide an apparatus for mariculture which incorporates circulation means, new water migration means, oxygenation of the water, as well as providing nutrients and antibiotics to the water environment for maximum growth rate and quality.

It is still another object of the present invention to provide a mariculture system which is relatively transportable, and which allows the containment of the mariculture crop during transport, while allowing apparatus to act as a permeable container when desired allowing the migration of new water therein.

It is still another object of the present invention to provide a new and unique method of harvesting a mariculture crop, without the necessity to go into the field for said harvesting.

Lastly, it is a method of the present invention to provide a new and unique method and apparatus for purging mollusks such as oysters and the like of any pollutants or toxins therein.

BRIEF DESCRIPTION of the DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EXEMPLARY EMBODIMENT(S)

Figure 1:
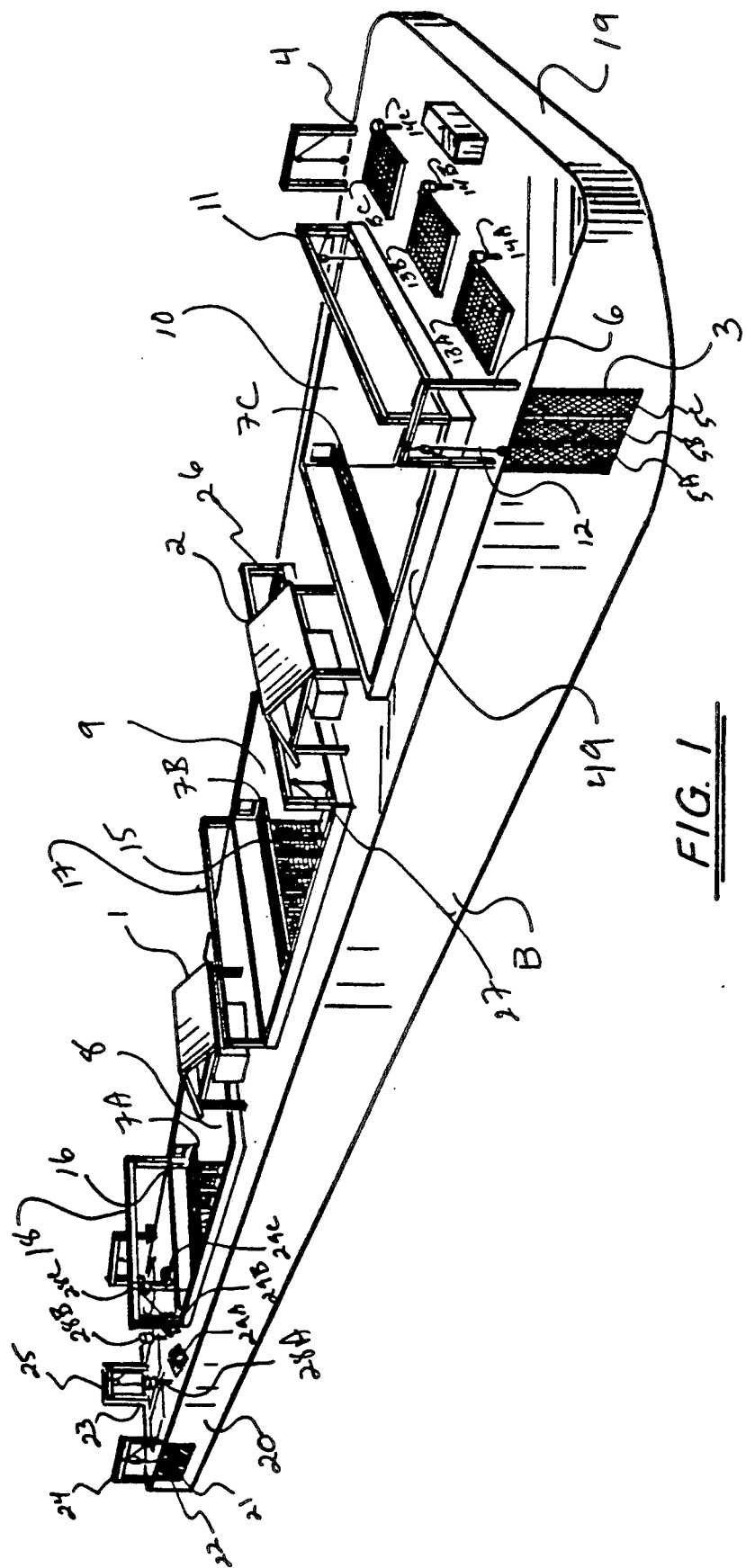
FIG. 1 is a side, perspective view of the preferred embodiment of the mariculture facility of the present invention.

As can be seen in FIG. 1, the mariculture apparatus and method of the preferred, exemplary embodiment of the present invention comprises the implementation of a converted "hopper" barge B as commonly used to transport such commodities as grains, coal and the like to an apparatus that can farm Redfish and other marine species, in conjunction with a method of mariculture which is novel, utilitarian, and unobvious relative to the prior art.

The result is an apparatus and system which efficiently provides a greater harvest of fish or the like in less time than the prior art.

The exemplary embodiment of the present invention illustrates a method of using the apparatus in conjunction with Redfish farming; this is not intended to limit the present invention to the Mariculture of Redfish, for the present invention may be easily adapted to a wide variety of marine species, both fresh and salt water.

For example, the present invention has been found to be effective in the purification of oysters and the like, wherein contaminated oysters are placed in the tanks on racks and clean water is circulated though the area in conjunction with antibiotics if desired, to cleanse the contaminated mollusks, making them consumable.

As shown in FIGS. 1-5, "hopper" areas of the barge B have been converted to holding tank areas 8, 9, 10 for the Redfish. The holding tank areas are formed in the barge such that there remains, in the exemplary embodiment, a two foot clearance from the bottom of the tank to the base of the barge, and a two foot clearance between the walls of the tank. These clearances allow for the placement of ballast at the base of the barge for stability, while the void between the walls adds flotation to the apparatus. The barges of the exemplary embodiment of the present invention measure 195 feet long, 35 feet wide, and 12 feet deep (exterior dimensions).

Figure 4:
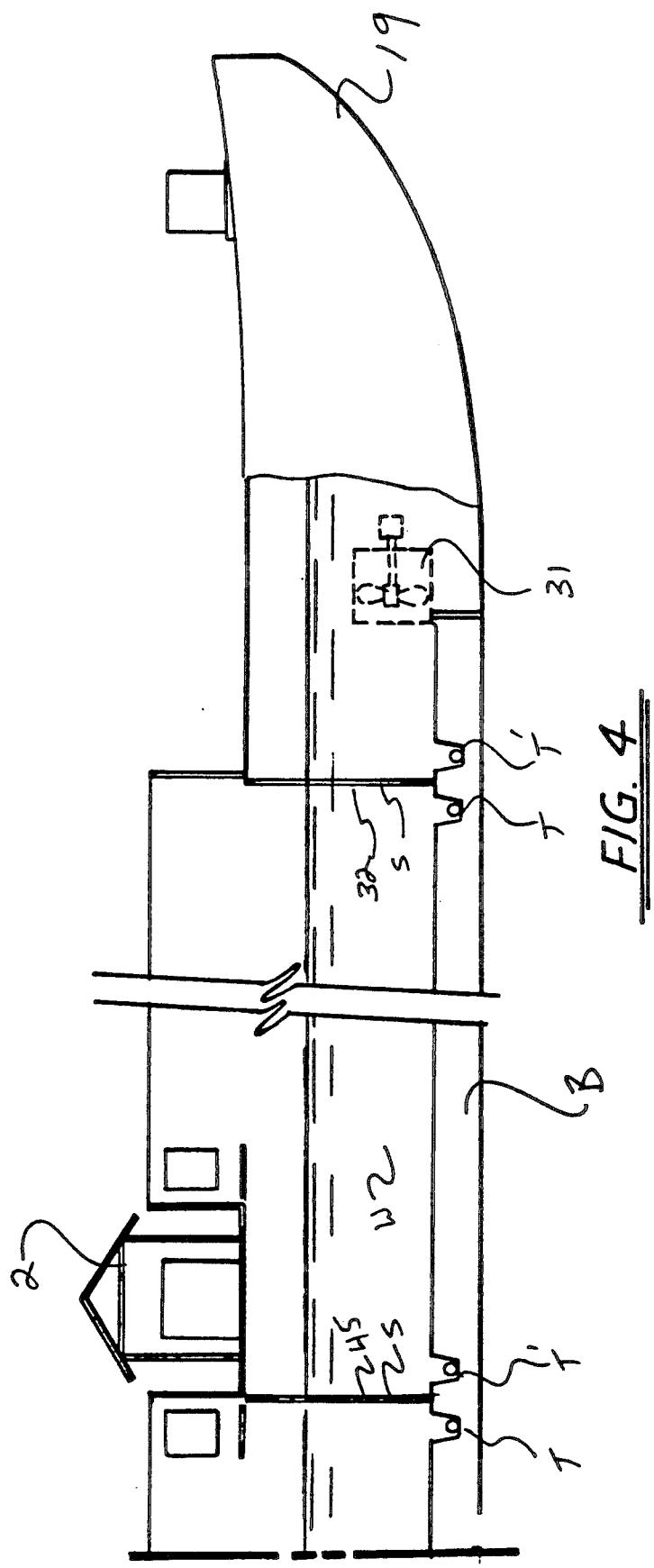
FIG. 4 is a side view of the first half of the mariculture facility of FIG. 2
Figure 5:
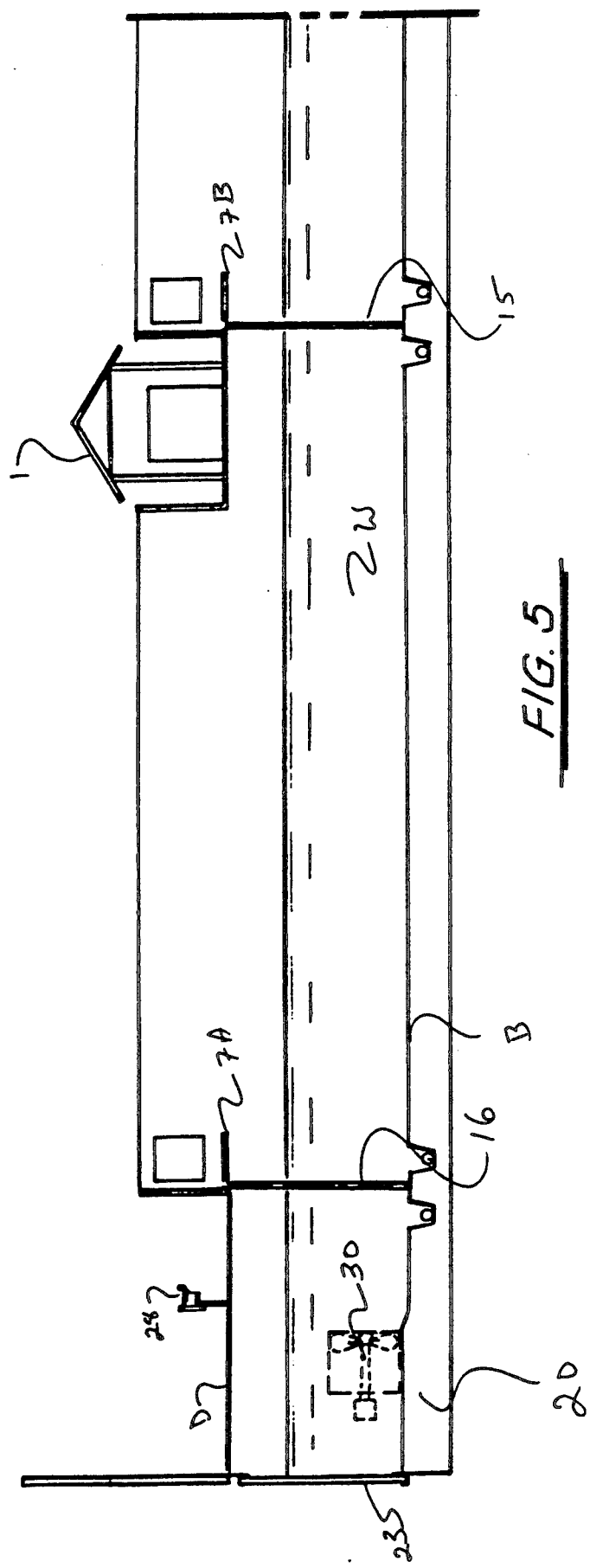
FIG. 5 is a side view of the second half of the mariculture facility of FIG. 3.

The holding tanks 8, 9, 10 of the present invention are contiguous in structure and thus may form one large tank, or may be sectioned off via screens 15 to effectively form two or more tanks, as with the installation of screens 45 shown on FIG. 4. As shown in FIGS. 4 & 5, screen walls 16, 32, comprising a plurality of individual screens, are utilized for forming the end walls of the holding tanks 8, 9, 10.

It may be desirable to section off the tank via the above screens, especially when it is necessary to segregate the fish according to species or size. For example, this segregation is necessary when farming grown redfish and fingerlings in the same tank, as the grown redfish will tend to eat the fingerlings. The holding tanks of the present invention measure approximately forty feet long, thirty feet wide and 16 feet deep. The interior tank walls are painted with a freshwater tank coating, which is nontoxic and prevents rust.

Returning to FIG. 1, the present apparatus as implemented includes coffer ports 3, 4, 22, 23 on the port, starboard, fore, and aft sections of the barge. As illustrated in the present figure, the coffer ports may be screened 5a, 5b, 5c, 21 for allowing circulation of the outside water with the holding tanks 8, 9, 10, as will be further discussed below. The screens slidingly engage the coffer ports, and are raised and lowered via cable arrangement 12 and screen lifting arrangement 6, 24, 25. The screens in the exemplary embodiment of the present invention are engaged via channel iron or I beam supports 50.

As the name implies, the coffer ports 3, 4, 22, 23 may be sealed to form a water impermeable barrier via plywood inserts or the like. The sealed coffer ports may serve two functions; namely, to close exterior circulation of water from the tanks for preventing the entry of polluted waters or the like, or, to allow the pumping out, either fully or partially of the tanks to lift the barge from the bottom of the canal and render it navigable. The system may also be closed to allow the concentrated circulation of oxygen or antibiotics within the tanks, as discussed infra.

During transport, the coffer ports of the present invention are sealed, allowing the barge B to be towed to the desired destination for farming the fish. The desirability may be dependent upon salinity of the water, purity, PH, temperature, weather conditions, etc. Once at the desired destination, the screens are placed, and the space between the walls and bottom of the tanks is flooded, allowing the barge B to sink in place 10-11 feet to the bottom, forming a stable platform for mariculture operations.

When the fish are of adequate size for harvesting, the annulus may be emptied of water in a manner so as not to free the fish, allowing the barge to be moved to the harvesting site. This may be also necessary where the barge must me moved in the middle of mariculture operations due to pollution, salinity, weather, etc.

It is, however, most desirable to maintain the coffer ports in the opened, screened configuration as this configuration promotes optimal growth, as opposed to a closed, circulating system, which tends to stagnate growth of the fish.

In the present, exemplary embodiment of the invention, the screens are constructed of polyurathane, which is somewhat more resistant to algae growth than other materials. When the present invention is raising fingerling size fish, the screens must have openings of at most ¼ inch; the screens may be replaced to ones with one-half or one inch openings as the fish increase in size.

Figure 10:
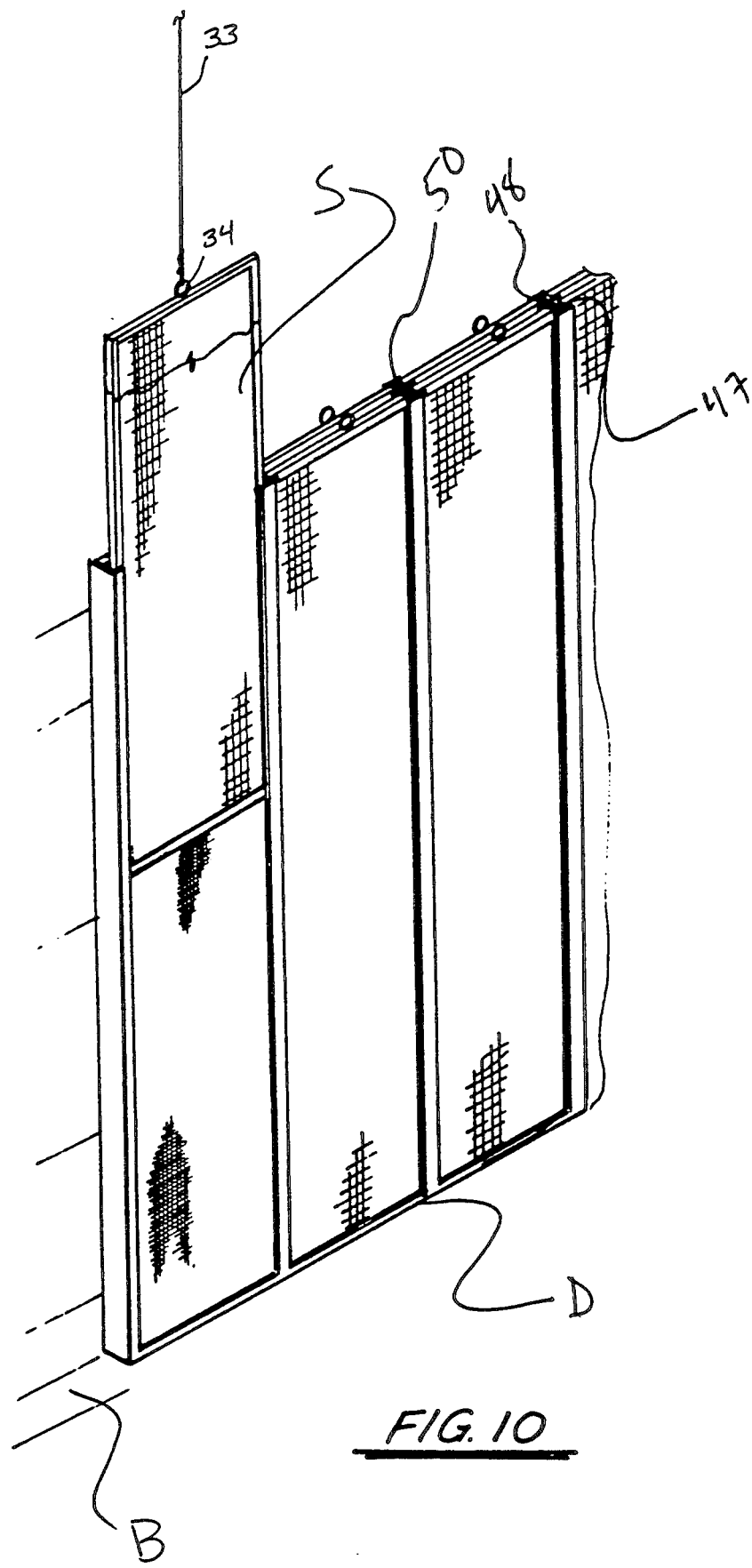
FIG. 10 is a side, perspective view of the coffer screens of the invention of FIG. 1.
Figure 11:
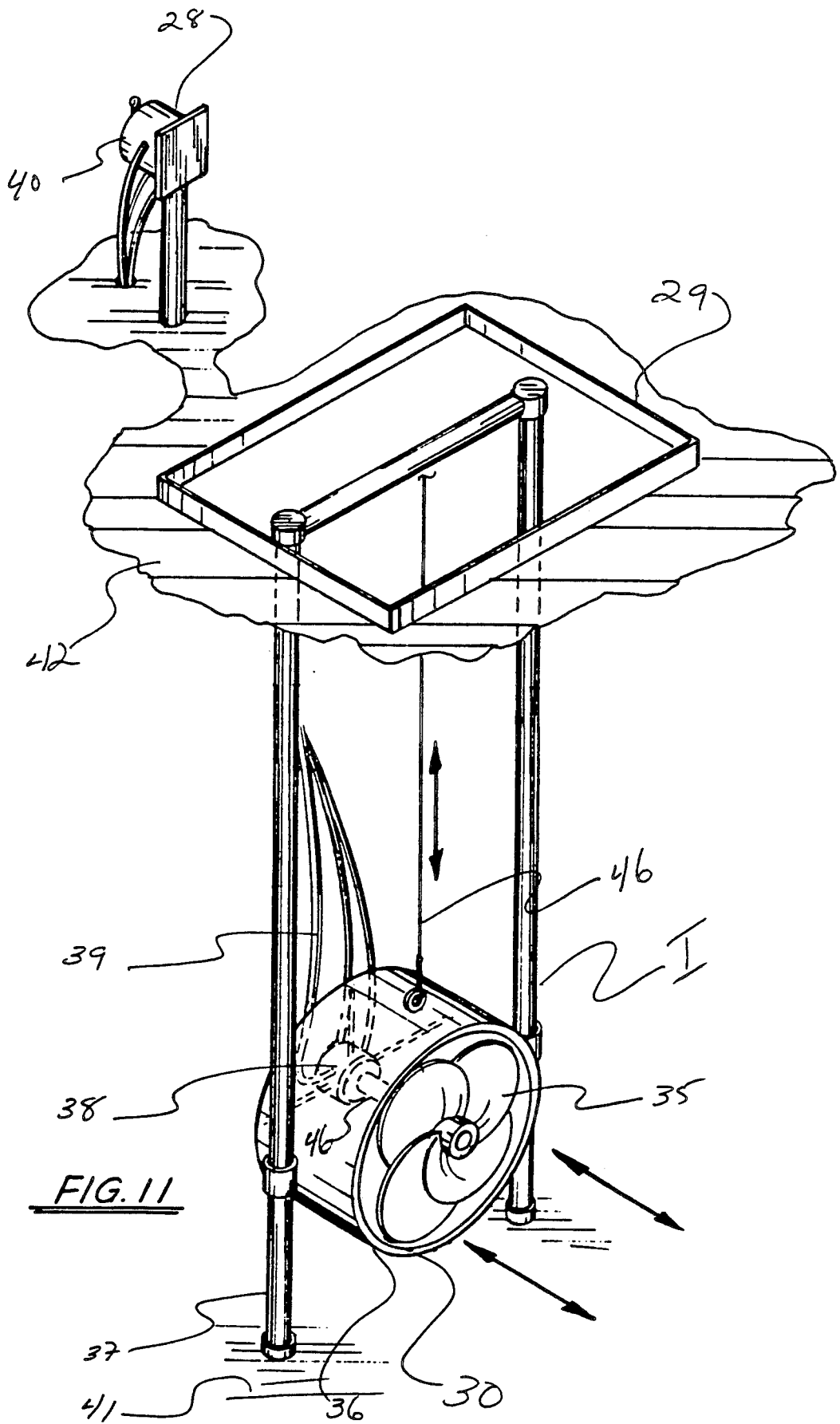
FIG. 11 is a side, perspective view of the hydraulic circulation and water exchange apparatus of the invention of FIG. 1, illustrating the means for raising and lowering the impeller drive system.

As further illustrated in FIG. 10, the lifting arrangement may include a lift cable 33 and winching system, wherein the cable 33 attaches to an eyelet 34 on screen S; as stated earlier, screen S slidingly engages coffer door D. Similar lifting arrangements 11, 17, 18, 26 are utilized for installing and removing the individual screens comprising their respective holding tank screen walls 32, 15, 16, 45, as shown in FIGS. 4 & 5. In the exemplary embodiment of the present invention, the individual screens comprising the tank screen walls measured approximately three feet wide by eight feet tall.

As further illustrated in the present figure, the coffer door screens are slidingly engaged in tandem via outer 47 and inner 48 slots. This allows the screens to be removed for cleaning while preventing escape of the fish therein. In addition to removal of the screens for cleaning, the screens may be brushed in place with a scrub brush or the like for removing any algae growth or deposits, shortening the maintenance period.

As further taught in FIG. 1, the exemplary embodiment of the present invention includes engine/generation sheds 12, wherein electrical power is provided.

Figure 2:
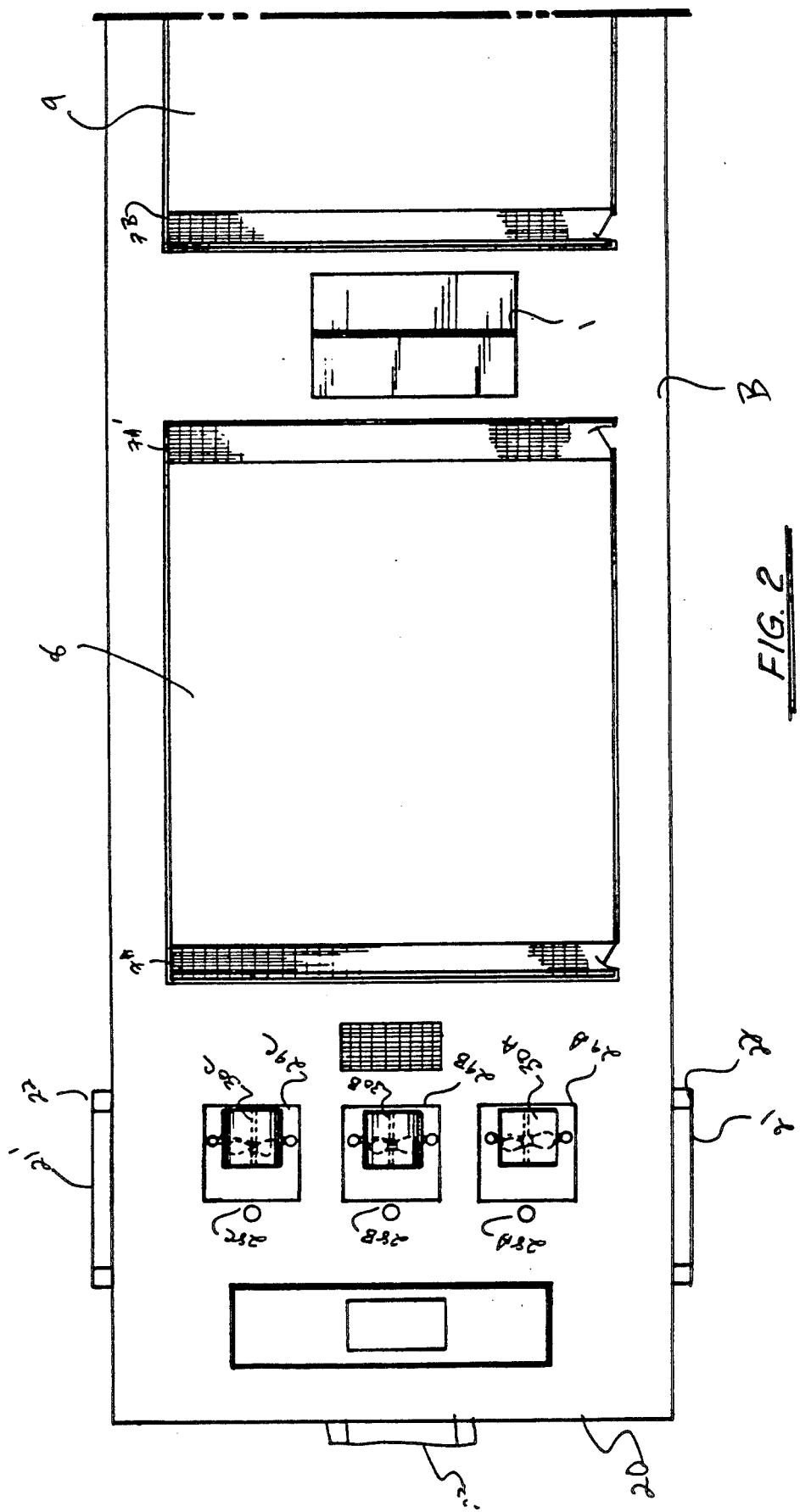
FIG. 2 is a top view of the first half of the mariculture facility illustrated in FIG. 1.
Figure 3:
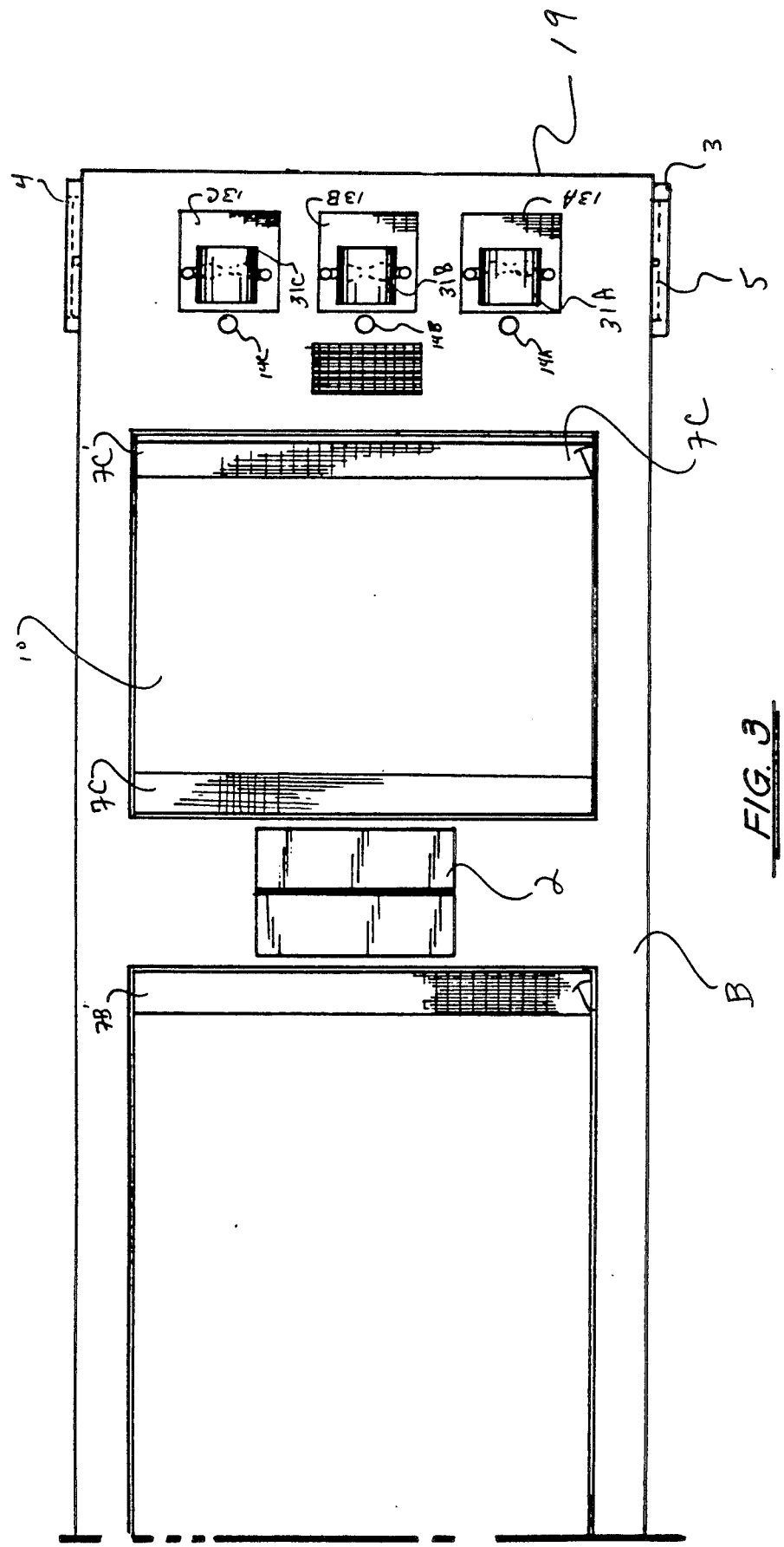
FIG. 3 is a top view of the second half of the mariculture facility illustrated in FIG. 1.

Illustrated in FIGS. 2 & 3 is the aft 20 and fore 19 sections of the barge B, respectively. Shown in the top view of the aft 20 section is impeller shafts 29A, 29B, 29C which contain impeller units 30A-C, powered by their respective hydra-electric power units 28A-C. Similarly, the fore 19 section contains impeller shafts 13A-C, containing impeller units 31A-C, powered by hydra-electric units 14A-C.

Also illustrated in the top figures of barge B illustrated in FIGS. 2 & 3 is catwalks 7A, 7A', 7B, 7B', 7C, 7C' along tank sections 8, 9, 10 respectively. Also shown is a four foot wall 49 around the periphery of the tanks, preventing personnel from falling in the tanks and allowing the tanks to be filled to a height above the deck 42.

FIGS. 4 & 5 illustrate side views of the fore 19 and aft 20 sections of the present invention, respectively. As shown, the barge B of the present invention may be partially submerged such that water W is contained in tank areas 8, 9, 10, said tank areas sectioned via screens 32, 45, 15, and 16. Impeller units 30, 31 are shown in their operable position to permit circulation of the water through the coffer doors D when open, or within the system tanks when said doors D are closed.

FIG. 10 illustrates in detail the construction of the impeller system I of the present invention. As shown, the impeller 35 is situated in a generally cylindrical housing 36 which in turn is slidingly affixed to vertical support 37 comprising two tubular support members affixed to the base of the barge, and of sufficient height to run to the upper deck 42 of barge B, terminating at one of the grid covers 13, 29. The impeller unit may be raised and lowered vertically via cable arrangement 46.

In the present invention, the screw forming the impeller 35 measures 39 ½ inches, is constructed of brass, and utilizes a 42 inch casing to form the housing 36 implemented therewith. The shaft 46 supporting the impeller 35 includes "Cutlass" rubber bearings, which are a water submergible means of providing a relatively frictionless impeller drive shaft.

The impeller unit I in the present invention is powered via hydraulic motor 38 running off of hydra-electric drive means 40, diverting controlled hydraulic pressure to the motor 38 via hydraulic hoses 39. Electricity to power the hydra-electric drive means is provided via electrical generators located in the engine sheds 1, 2 or by conventional utility power supplied via electrical line from off the vessel. The present invention contemplates the use of a variable speed control for changing the impeller speed and reversal means via hydraulic valve or other arrangement. The present system as designed can operate with as little as 300 pounds of hydraulic pressure, making it very efficient and cost effective.

The present invention utilizes one GM eight cylinder three hundred horsepower diesel engine per shed as the primary power plant to power each a 150 KW generator, providing ample electricity to power the hydraulic impeller motors as well as lighting and other miscellaneous power.

In the exemplary embodiment of the present invention, lighting is extensively used in the tank area to control feeding habits and maximize growth. Lighting the tank area at night gives the fish the impression of continuous daylight, which has been found to increase their growth rate over time.

Hydraulic line means for powering impellers 30, 31 is preferred in the present invention over direct electric power through electric motor due to safety considerations, as the impeller and drive means is submerged in water, and taking into account that the structure is made of electricity-conducting steel or the like.

In the present invention, 15 horsepower, 1200 rpm electric motors are implemented topside on the deck 42 in conjunction with a 30 horsepower hydraulic pump, forming hydra-electric means 14A-L C, 28A-C, which in turn propels impellers 30, 31 via hose 39 connection to hydraulic motors 38. This provides a reliable, low-maintenance, safe means of circulation.

It has been found that circulation of the present system is critical for providing accelerated growth rates of the fish, as well as providing maximum harvest tonnage with minimal tank space. The present system provides a circulation system which is variable depending upon the crop and environmental conditions, providing in the exemplary embodiment an apparatus having six individually powered, variable speed impeller units 30A-C, 31A-C.

Figure 8:
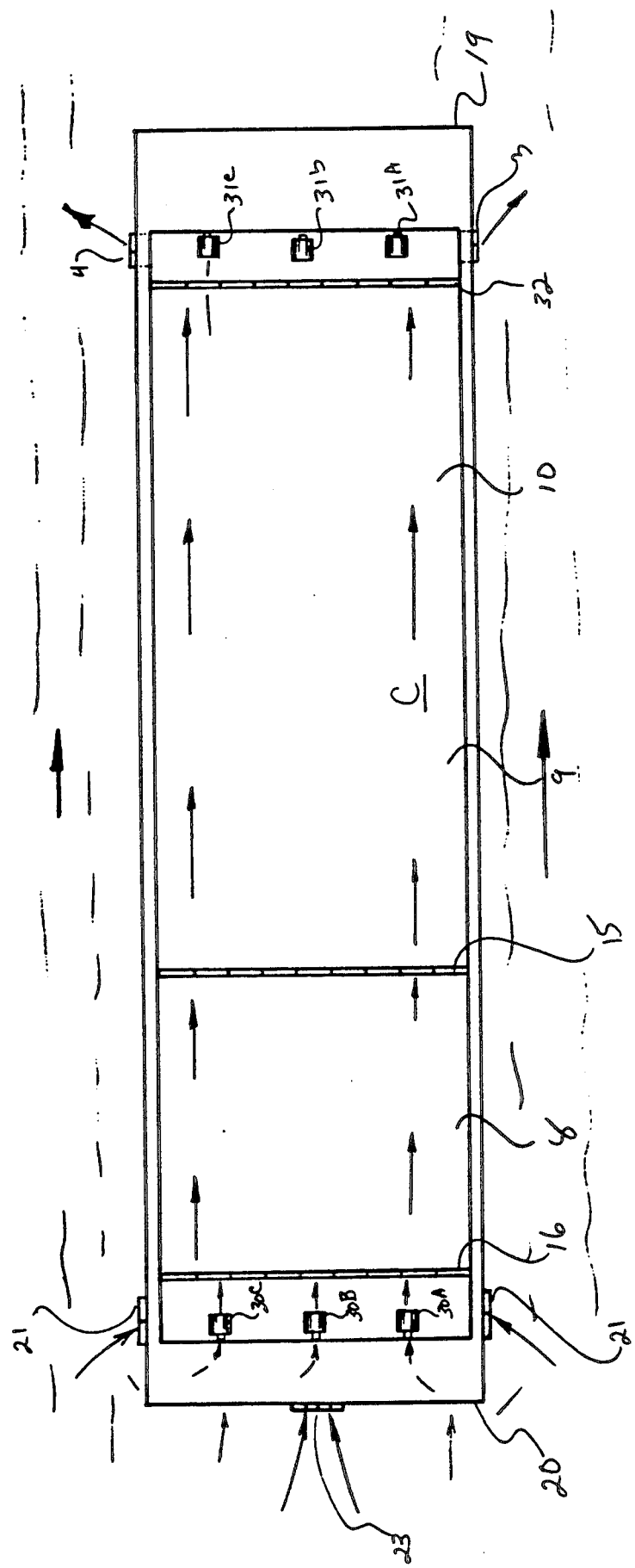
FIG. 8 is a top view of the mariculture facility of claim 1, illustrating the water exchange patterns of the present invention.

FIG. 8 illustrates the configuration and operation of the circulation means of the present invention, wherein circulation pumps 30A-C draw in water from aft coffer ports 21, 21', 23, passing it through tank sections 8, 9, 10 and through fore coffer ports 3, 4. Fore impeller units 31A-C may be used to increase the circulation C of the water as desired. This arrangement may be reversed with similar satisfactory results.

Figure 9:
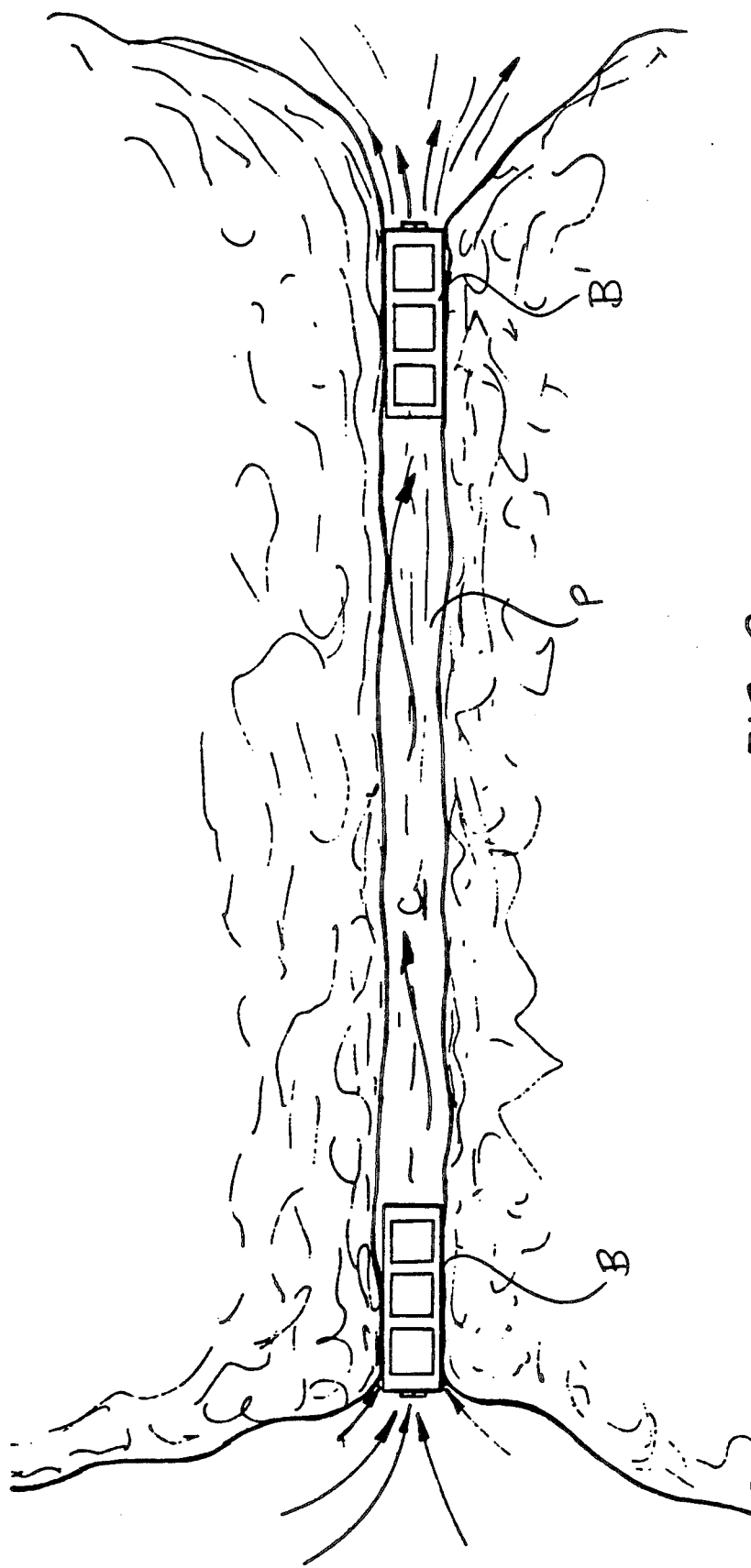
FIG. 9 is a top view of the mariculture facility of claim 1, illustrating a method of using the apparatus of the present invention in pairs in conjunction with a waterway such as a canal or the like, forming a sealed water area suitable for mariculture.

FIG. 9 exemplifies an example of how two of the mariculture barges B, B' of the present invention may be implemented in conjunction with a canal to form a closed, circulating mariculture pond P. In this example of use, barges B, B' are placed at the desired positions on the canal or other water body such that the width of the barge is substantially the same as that of the canal, and the barges are partially submerged to close off the canal, allowing fish to be placed therebetween in a closed, circulating habitat. In this position, the impeller circulation means disclosed supra may be used in tandem on barges B, B' to circulate the water through the pond P.

With this method of use, the redfish may be farmed from their immature, fryer state to about nine inches in the tank, and released into the blocked area of the canal to be raised "in the wild". At approximately three pounds (about 18 months), the fish are ready to be harvested.

In marine farming, a primary concern is the purity of the water; with a closed or partially closed system, as implemented in the present invention, and wherein a large volume of marine life is concentrated in minimal tank space, the concentration of fish waste products must be removed to prevent toxic build up. In conjunction with the above discussed circulation means, the present invention provides sediment troughs for removing any remaining waste not disposed of through circulation out of the barge.

Figure 6:
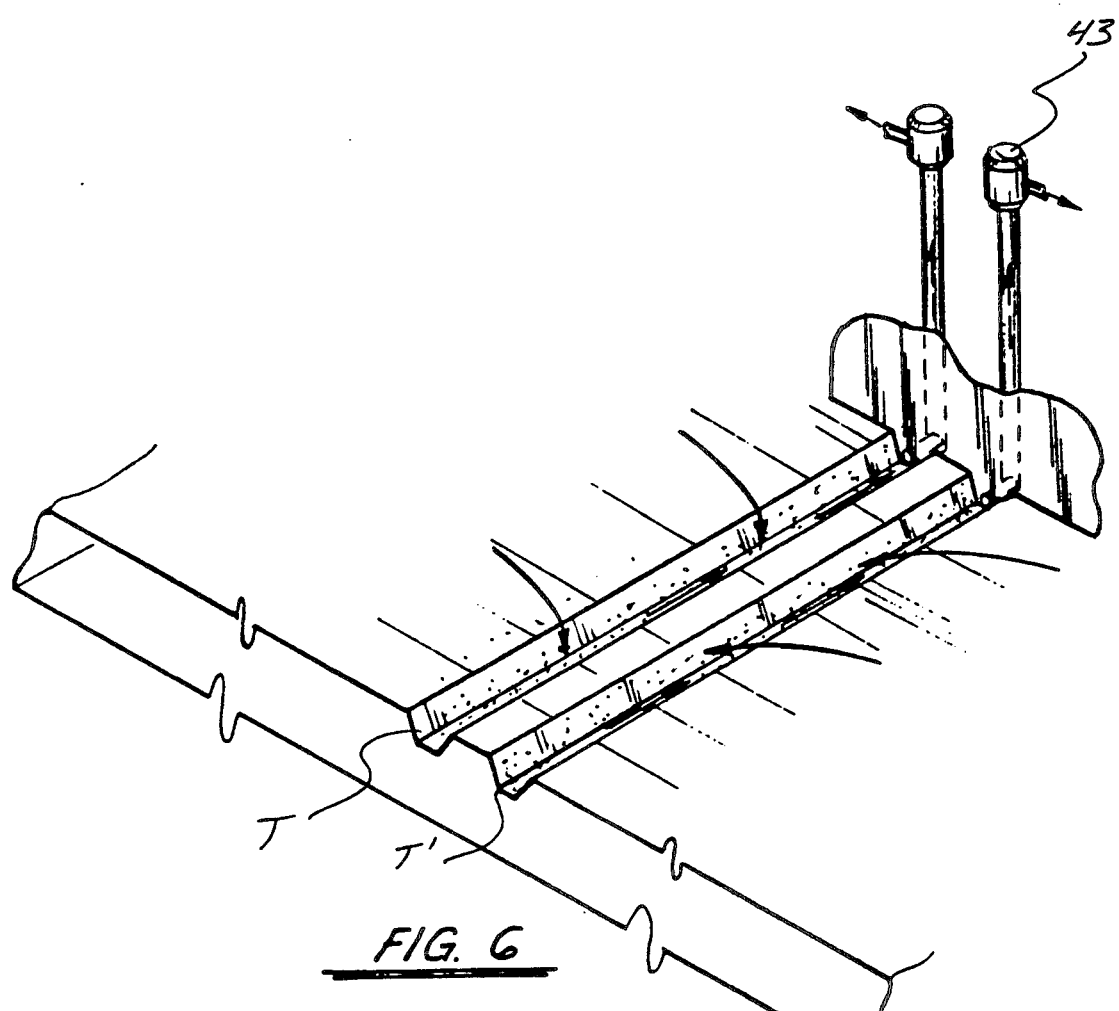
FIG. 6 is a side, perspective, partially cross-sectional, partially cut-away view of the sediment trough of FIG. 1.
Figure 7:
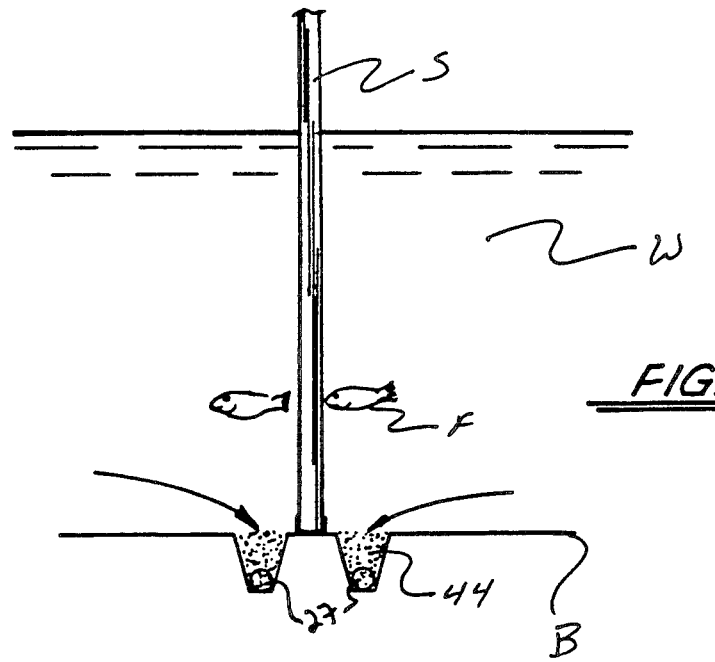
FIG. 7 is a side, partially cross-sectional view of the sediment trough of the invention of FIG. 1.

Juxtaposed each tank screen 32, 45, 15, and 16, is sediment trough T, T', wherein sediment is deposited and may be removed, as further described in FIGS. 6 & 7. As shown in FIGS. 6 & 7, sediment 44 from the fish F is deposited into troughs T, T' wherein they are vacuumed into conduit 27 and through sediment pump 43. The sediment may then be stored in tanks or the like or may be disposed of into the canal some distance from the barge. The present sediment pump used with the invention is an electric "low lift" pump as used with fire control systems, and is on the order of 25 to 50 horsepower. The exemplary embodiment of the present invention utilizes a perforated 5" pipe at the base of the trough, wherein the suction means emanates. The exemplary embodiment has sediment troughs on each side of each set of tank screens, comprising a total of 8 troughs.

The present invention also may implement water conditioning means in the form of oxygenation of the water and the infusion of antibiotics into the water. Oxygenation may be performed by using liquid oxygen defused through air rocks or pipes. The present embodiment of the invention contemplates the utilization of air blowers which would feed air into the water via an air rock or pipe arrangement.

Antibiotics may also be directly infused into the tanks, manually or via automated dispensing, to prevent disease among the fish. To "medicate" the fish via antibiotics or other medication, the coffer ports are closed via a fluid impermeable barrier such as plywood, sheet steel or the like, and the medication is then infused into the water and circulated via circulation means for the desired period of time.

The fish are fed utilizing fish food, shredded crabs, fish, and other matter. In the exemplary embodiment of the invention, an electronic shredder is provided; the feed is then thrown into the tanks.

The present, exemplary embodiment of the invention also has on board the barge a security system, storage facilities, and refrigeration for the bait and/or mariculture crop.

The embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiment(s) herein detailed in accordance with the descriptive requirements of the law, it is to be understood that the details herein are to be interpreted as illustrative and not in a limiting sense.

What is claimed is:

1. An apparatus for the mariculture of marine life on or in a body of water, said apparatus comprising:
    tank means for containing a plurality of marine animals;
    water exchange means associated with said tank means for exchanging water throughout said tank means, said water exchange means further comprising at least one impeller system, said impeller system further comprising:
    an impeller,
    rotation means for rotating said impeller,
    housing means for housing said impeller, and
    vertical support means for supporting said housing and allowing its vertical position to be raised for operating at different vertical levels;
    vessel means for containing said water exchange means and said tank means;
    coffer port means allowing the ingress or egress of water from said body of water to and from said tank means for exchanging via said water exchange means, or for sealing said tank means from said body of water via fluid impermeable barrier engaged therewith; and
    marine life barrier means engaged with said coffer port means preventing the escape of the marine life from said tank means.

2. The apparatus of claim 1, wherein said vessel means comprises a barge having a base, two side walls, a deck, and aft and fore ends.

3. The apparatus of claim 2, wherein said vertical support means comprises two tubular support members affixed in parallel fashion relative one another perpendicular to and affixed to the base of said barge and the deck of said barge, said tubular support members slidingly affixed to said housing means, allowing said housing means to be placed in various vertical positions relative to said barge.

4. The apparatus of claim 3, wherein said rotation means further comprises a hydra-electric arrangement, said hydra-electric arrangement further comprising a hydraulic motor mounted to said housing and affixed via shaft arrangement to said impeller, a hydraulic compressor affixed via shaft means to an electric motor, said hydraulic compressor affixed to said electric motor such that said electric motor powers said hydraulic compressor, hydraulic fluid compressed by compression action of said compressor, and hose means for communicating said compressed hydraulic fluid to said hydraulic motor.

5. The apparatus of claim 4, wherein there is further included electrical generation means.

6. The apparatus of claim 2, wherein said coffer port means comprises at least one rectilinear configured opening in said side walls of said barge.

7. The apparatus of claim 6, wherein said marine life barrier means further comprises means to slidingly engage a screen to said coffer port means, said screen for blocking passage of said marine life through said coffer port means.

8. The apparatus of claim 7, wherein said screen is comprised of polyurathane.

9. The apparatus of claim 7, wherein there is further included sediment collection means, said sediment collection means further comprising at least one sediment trough in the base of said tank means, said sediment collection means further comprising vacuum pump means associated with said sediment trough for removing marine waste from said tank means.

10. The apparatus of claim 1, wherein said marine life comprise redfish.

11. A method of farming marine life on or in a body of water, said method comprising:
   a. providing a first device for the farming of marine life, said device including:
     tank means for containing a plurality of marine animals;
     water exchange means for exchanging water throughout said tank means, said water exchange means further comprising at least one impeller system, said impeller system further comprising:
      an impeller,
      rotation means for rotating said impeller,
      housing means for housing said impeller, and
      vertical support means for supporting said housing and allowing its vertical position to be raised for operating at different vertical levels;
     vessel means for containing said water exchange means and said tank means;
     coffer port means for promoting the ingress or egress of water from said body of water to and from said tank means for exchanging via said water exchange means, or for sealing said tank means from said body of water via fluid impermeable barrier engaged therewith;
     marine life barrier means engaged with said coffer port means, said marine life barrier means for preventing the escape of said marine life from said tank means;
   B. positioning said vessel means on a navigable body of water;
   C. opening said coffer port means;
   D. allowing the ingress of water into said tanks, lowering said vessel means into the water;
   E. engaging said marine life barrier means to said coffer port means for preventing the escape of said marine life from said tank means;
   F. dispensing a plurality of marine life into said tank means;
   G. engaging said water exchange means.

12. The method of farming marine life on or in a body of water of claim 11, wherein there is further included the step(s) of:
   i. on a navigable body of water having a first side, a second side, a bottom, a first end, and a second end, placing said first device on said first end of said body of water such that said first device communicates with said first and second sides of said body of water;
   ii. providing a second device for the farming of marine life, said second device including:
     tank means for containing a plurality of marine life;
     water exchange means for exchanging water throughout said tank means;
     vessel means for containing said water exchange means and said tank means;
     coffer port means for promoting the ingress or egress of water from said body of water to and from said tank means for exchanging via said water exchange means, or for sealing said tank means from said body of water via fluid impermeable barrier engaged therewith;
     marine life barrier means engaged with said coffer port means preventing the escape of said marine life from said tank means;
   iii. placing said second device on said second end of said body of water such that said second device communicates with said first side and said second side of said body of water;
   iv. flooding said tanks of said first and said second vessel;
   v. lowering said first vessel and said second vessel to the bottom of said body of water;
   vi. blocking said first end and second end of said body of water, forming a closed pond;
   vii. placing a plurality of marine life in said closed pond.

13. The method of claim 12, wherein there is included the additional step of:
   engaging said water exchange means of said first vessel and said second vessel in such a manner as to exchange water in said closed pond.

14. The method of claim 11, wherein there is included the additional step of:
   collecting marine sediment via sediment collection means.

15. A method of converting a hopper barge to an apparatus for the mariculture of farming marine life on or in a body of water, said method comprising:
   a. providing a hopper barge;
   b. converting said hopper barge to a device for the farming of marine life, said conversion including:
     incorporating tank means for containing a plurality of marine life;
     incorporating water exchange means for exchanging water throughout said tank means, said water exchange means further comprising at least one impeller system, said impeller system further comprising:

an impeller,
rotation means for rotating said impeller,
housing means for housing said impeller, and
vertical support means for supporting said housing and allowing its vertical position to be raised for operating at different vertical levels;
incorporating vessel means for containing said water exchange means and said tank means;
incorporating coffer port means for promoting the ingress or egress of water from said body of water to and from said tank means for exchanging via said water exchange means, or for sealing said tank means from said body of water via fluid impermeable barrier engaged therewith;
incorporating marine life barrier means engaged with said coffer port means preventing the escape of said marine life from said tank means.

* * * * *